(12) United States Patent
Kim

(10) Patent No.: US 6,807,672 B2
(45) Date of Patent: Oct. 19, 2004

(54) OPTICAL DISK DRIVE HAVING A SKEW ADJUSTMENT FUNCTION

(75) Inventor: Sang-joon Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 10/032,096

(22) Filed: Dec. 31, 2001

(65) Prior Publication Data

US 2003/0012121 A1 Jan. 16, 2003

(30) Foreign Application Priority Data

Jul. 13, 2001 (KR) .......................... 2001-42348

(51) Int. Cl.[7] .................. G11B 23/00; G11B 17/028
(52) U.S. Cl. ..................................... 720/700
(58) Field of Search .................. 369/75.1, 75.2, 369/264, 244, 219; 720/700, 695

(56) References Cited

U.S. PATENT DOCUMENTS 5,970,035 A * 10/1999 Ohmori et al. ............ 369/53.2
6,122,237 A    9/2000 Ohmori et al.

FOREIGN PATENT DOCUMENTS

| EP | 0 400 949 | 12/1990 | | |
|---|---|---|---|---|
| EP | 0 829 873 | 3/1998 | | |
| JP | 62119742 A | * | 6/1987 | ............ G11B/7/09 |
| JP | 09120567 A | * | 5/1997 | ............ G11B/7/095 |
| JP | 10134387 A | * | 5/1998 | ............ G11B/7/095 |
| JP | 10-208373 | 8/1998 | | |
| JP | 2000235722 A | * | 8/2000 | ............ G11B/7/095 |
| JP | 2000285471 A | * | 10/2000 | ............ G11B/7/08 |
| JP | 2001101778 A | * | 4/2001 | ............ G11B/19/20 |
| KR | 2001068768 A | * | 7/2001 | ............ G11B/17/04 |

* cited by examiner

*Primary Examiner*—William Klimowicz
(74) *Attorney, Agent, or Firm*—Staas & Halsey LLP

(57) ABSTRACT

An optical disk drive includes, a main body, a tray driven by a loading motor transporting a disk in or out of the main body, and a base chassis on which an optical pickup emitting a beam onto a recording surface of the disk is mounted. A rotary chassis, installed to rotate with respect to the base chassis, has a turntable on which the disk is to be placed. Also, the optical disk drive includes a skew adjustment mechanism controlling skew between the disk placed on the turntable and the optical pickup mounted on the base chassis by rotating the rotary chassis. The optical disk drive dynamically controls skew between the disk and the optical pickup so that light is incident on the disk in a precise direction, thereby increasing its performance of data recording and reproducing.

13 Claims, 4 Drawing Sheets

OPTICAL DISK DRIVE HAVING A SKEW ADJUSTMENT FUNCTION

CROSS REFERENCE TO RELATED APPLICATIONS

This application claims the benefit of Korean Application No. 2001-42348, filed Jul. 13, 2001, in the Korean Industrial Property Office, the disclosure of which is incorporated hereby by reference.

BACKGROUND OF THE INVENTION

1. Field of the Invention

The present invention relates to an optical disk drive, and more particularly, to an optical disk drive having a function for dynamically controlling a skew between an optical pickup and a disk recording surface.

2. Description of the Related Art

An optical disk drive is a machine that reads data from and writes data onto a disk, which is a recording medium, by emitting a laser beam onto the disk.

In FIG. 1 an optical disk drive includes a drive main body 10, a tray 40 having a surface 41 on which a disk 1 is placed and transported in or out of the main body 10, a frame 20 rotatably installed in the main body 10, and a chassis 30 supported on the frame 20. A turntable 32 on which the disk 1 transported by the tray 10 is mounted and an optical pickup 31 moved in the radial direction of the disk 1 for recording and reproducing data on the disk 1, are mounted on the chassis 30. Relay gears 13a, 13b and 13c mesh a loading motor 11 with a rack 42 disposed on the bottom of the tray 40 so that the loading motor 11 transmits power to the rack 42. A cam member 12 having a cam groove 12a is fitted into a cam protrusion 21 of the frame 20. The cam member 12 receives the power of the loading motor 11 to move the cam protrusion 21 up and down while sliding from side to side. Thus, as the cam member 12 moves from side to side, the cam protrusion 21 moves up and down along the cam groove 12a, thereby enabling the frame 20 to rotate about a rotary axis 22 supported on the main body 10.

A protrusion 12c is provided on the cam member 12 so that the protrusion 12c contacts a guide rail 43 provided on the bottom of the tray 40 to slide when the tray 40 moves in or out of the main body 10. The protrusion 12c slides along a linear portion of the guide rail 43 until the tray 40 almost goes into the main body 10 and is slightly displaced to the right of FIG. 1 at a slanting portion 43a thereof, thereby allowing a gear 12b of the cam member 12 to mesh with the relay gear 13c. Consequently, the power of the loading motor 11 used for moving the tray 40 into the main body 10 is also the power used for sliding the cam member 12.

In FIG. 1, when the disk 1 is loaded on the tray 40 and introduced into the main body 10, the cam member 12 turns to rotate the frame 20 so that the disk 1 is mounted on the turntable 32. Then, the turntable 32 rotates to enable the optical pickup 31 to reproduce information recorded onto the disk 1 or record new information onto the disk 1.

To form a focused light spot on the disk 1, light emitted from the optical pickup 31 must be incident perpendicular to a recording surface of the disk 1. If the direction of the incident light deviates from the perpendicular angle, forming a focused light spot on the disk 1 is difficult. As a result, errors may occur in recording and reproducing data. Thus, to form a focused light spot, the angle between the disk 1 and the optical pickup 31 needs to be adjusted accurately so that the light is incident perpendicular to the recording surface of the disk 1. Generally, the adjustment is called a "skew adjustment."

The optical pickup 31 has a servomechanism for dynamically controlling or displacing an objective lens so that light is focused on the recording surface of the disk 1. However, if the optical pickup 31 is skewed relative to the disk 1 at an angle greater than 1° due to process errors in the disk 1 or the surface of the turntable 32 on which the disk is to be placed, the skew between the optical pickup 31 and the disk 1 may not be completely compensated for simply by the servomechanism of the objective lens.

Accordingly, to more precisely perform recording and reproducing, an optical disk drive with a function of dynamically controlling skew between the disk 1 and the optical pickup 31 is highly desirable.

SUMMARY OF THE INVENTION

Accordingly, it is an object of the present invention to provide an optical disk drive having an automatic skew adjustment function.

Additional objects and advantages of the invention will be set forth in part in the description which follows and, in part, will be obvious from the description, or may be learned by practice of the invention.

The foregoing and other objects of the present invention are achieved by providing an optical disk drive including, a main body, a tray, driven by a loading motor, and transporting a disk in or out of the main body, and a base chassis on which an optical pickup emitting a beam onto a recording surface of the disk is mounted. The optical disk drive also includes a rotary chassis, installed to rotate with respect to the base chassis and having a turntable on which the disk is to be placed, and a skew adjustment mechanism controlling skew between the disk placed on the turntable and the optical pickup mounted on the base chassis by rotating the rotary chassis.

The screw adjustment mechanism includes a cam member, driven by the power of the loading motor and having a predetermined cam groove, and a cam protrusion formed at a free end of the rotary chassis to fit into the cam groove. When the cam member is driven by the loading motor, the cam protrusion slides along the cam groove, thereby raising the free end of the rotary chassis.

BRIEF DESCRIPTION OF THE DRAWINGS

These and other objects and advantages of the invention will become apparent and more appreciated from the following description of the preferred embodiments, taken in conjunction with the accompanying drawings of which.

DETAILED DESCRIPTION OF THE PREFERRED EMBODIMENTS

Figure 1:
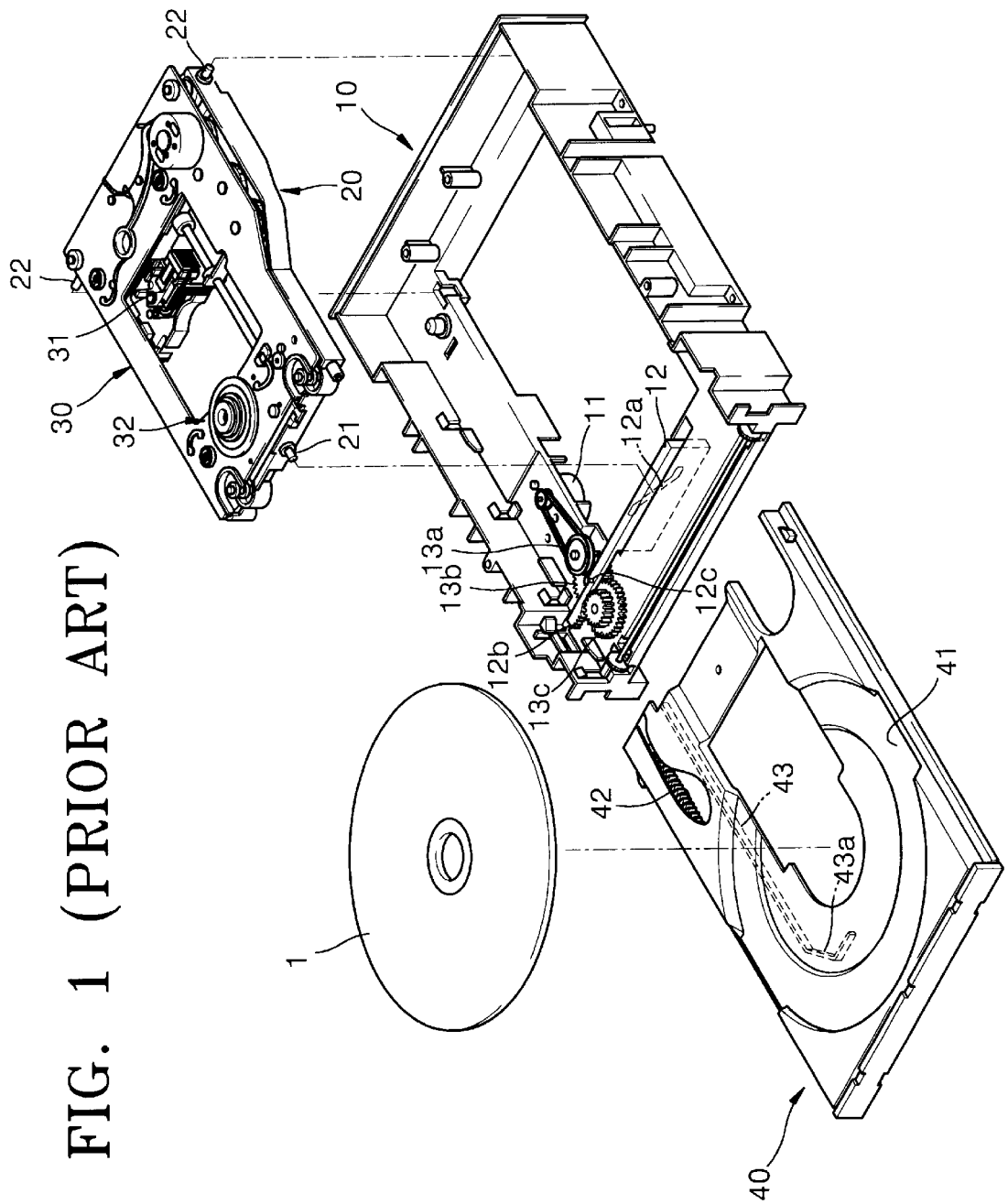
FIG. 1 is a perspective view of a conventional optical disk drive.

Reference will now be made in detail to the present preferred embodiments of the present invention, examples of which are illustrated in the accompanying drawings, wherein like reference numerals to like elements throughout.

Figure 2:
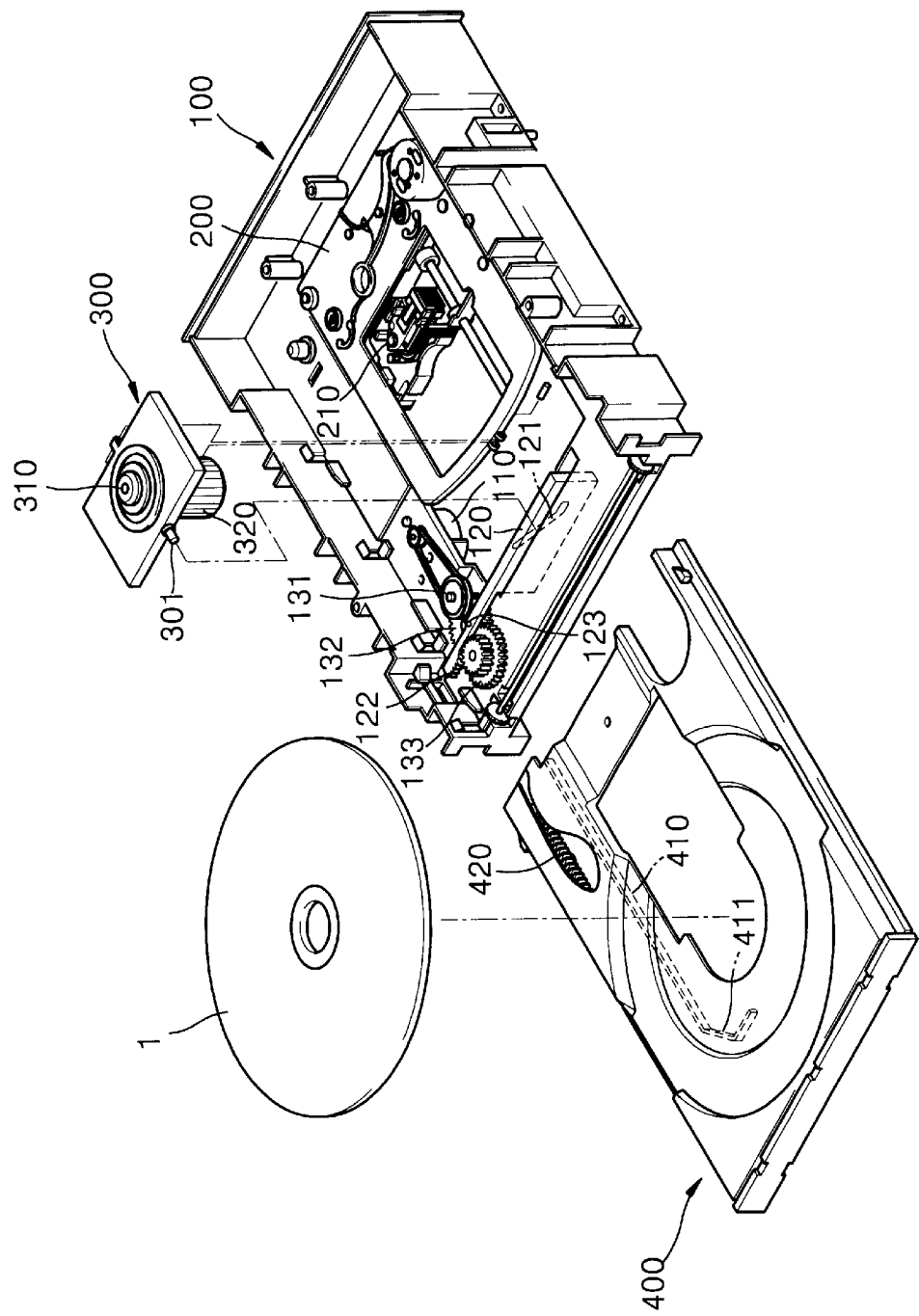
FIG. 2 is a perspective view of an optical disk drive having a skew adjustment function, according to an embodiment of the present invention.

In FIG. 2, an optical disk drive includes a tray 400 transporting a disk 1 driven by a loading motor 110 to move in or out of a main body 100. A base chassis 200 is disposed within the main body 100. An optical pickup 210, which is mounted on the base chassis 200, records and reproduces information by emitting a beam onto the disk 1 placed onto a turntable 310 while moving in the radial direction of the disk 1. A rotary chassis 300, to which the turntable 310 and a spindle motor 320 are attached, is rotatably installed at an end of the base chassis 200. The optical disk drive further includes a skew adjustment mechanism controlling skew between the disk 1 placed on the turntable 310 and the optical pickup 210 by rotating the rotary chassis 300. In this embodiment, the skew adjustment mechanism is configured to use the loading motor 110. That is, for example, the skew adjustment mechanism uses the loading motor 110 provided for loading the tray 400 as a drive source instead of installing a separate drive source, to thereby simplify the structure of the main body 100. To accomplish this, a cam member 120 designed to slide by the rotation of the loading motor 110, is installed in the main body 100. Additionally, a cam protrusion 301 slidably fitted into a cam groove 121 formed in the cam member 120, is provided at a free end of the rotary chassis 300. Thus, as the loading motor 110 rotates to move the cam member 120, the cam protrusion 301 slides to move up and down along the cam groove 121, thereby moving the free end of the rotary chassis 300 up and down as shown in FIG. 3.

Figure 4:
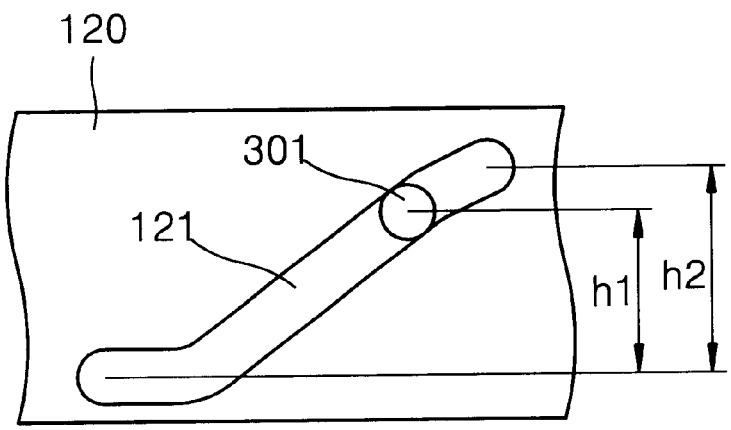
FIG. 4 is a diagram showing the cam groove of the cam member in the optical disk drive of FIG. 2, according to an embodiment of the present invention.

The structure for moving the cam protrusion 301 up and down the cam groove 121 of the cam member 120 as described above, is similar to that for moving the frame 20 up and down as described in FIG. 1. The difference, according to the present invention, is that the cam groove 121 of the cam member 120 is formed with a margin to further lift the rotary chassis 300 for skew adjustment after the disk 1 is placed on the turntable 310. Conventionally, the cam groove 12a is designed to lift the frame 20 until the disk 1 is placed on the turntable 32, as shown in FIG. 1. For example, as shown in FIG. 4, if h1 is a point where the disk 1 is placed on the turntable 310, the cam groove 12a is conventionally obliquely formed up to the point h1. The cam groove 121, according to the present invention, extends to a point h2 for skew adjustment.

Figure 3:
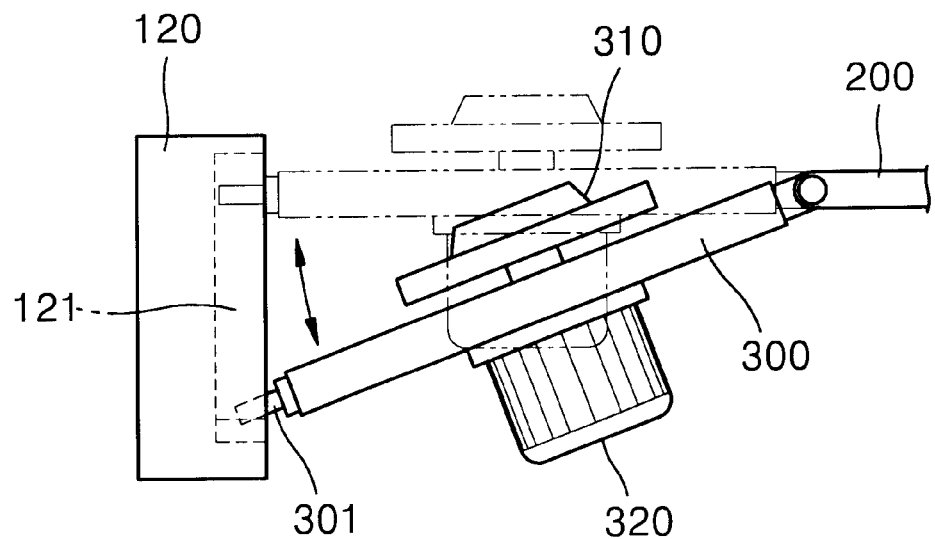
FIG. 3 is a diagram explaining the rotation performed by the skew adjustment mechanism in the optical disk drive of FIG. 2, according to an embodiment of the present invention.
Figure 5:
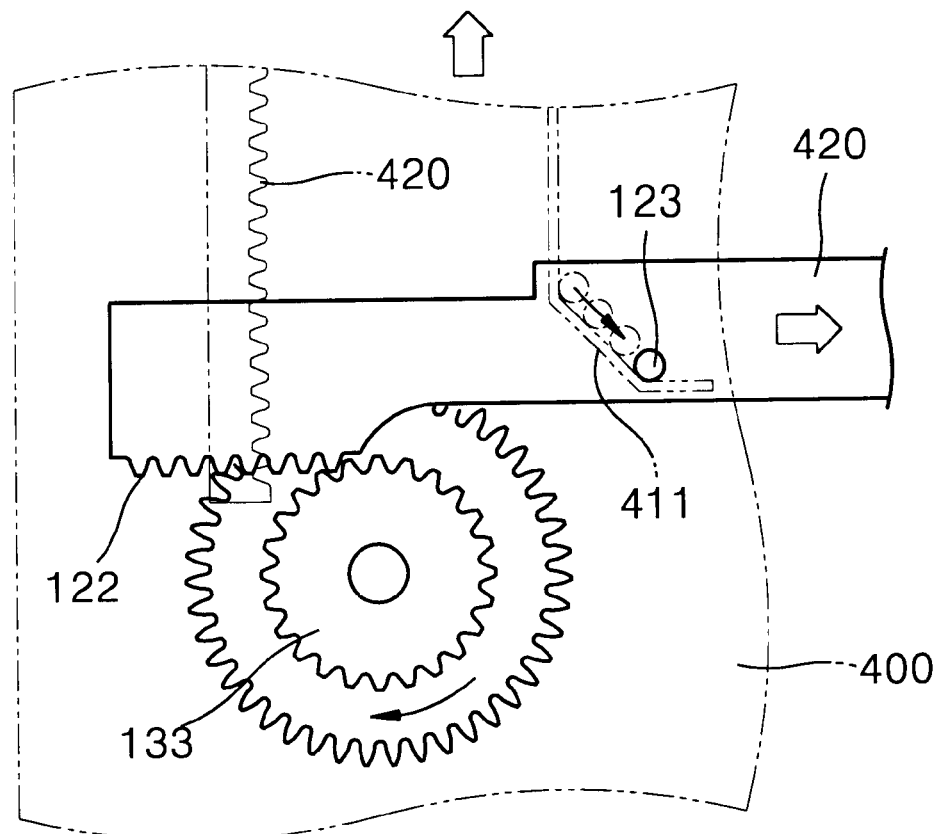
FIG. 5 is a diagram showing a process of switching the power of a loading motor from the loading of the tray into the main body to the sliding of the cam member, according to an embodiment of the present invention.

In FIG. 3, the rotary chassis 300 is lowered, as shown with a solid line, before loading the disk 1. Thus, when the loading motor 110 is driven to load the tray 400 on which the disk 1 is mounted into the main body 100, a slanting portion 411 of a guide rail 410 provided on the bottom of the tray 400, presses against a protrusion 123 so that the cam member 120 is displaced to the right as shown in FIG. 5. At this instant, the tray loading is complete, and a rack 420 located on the bottom of the tray 400 and connected with the loading motor 110 for power transmission through relay gears 131,132, and 133 is separated from the relay gear 133. A gear portion 122 of the cam member 120 displaced to the right by an interlocking of the slanting portion 411 with the protrusion 123 meshes with the relay gear 133. Thereafter, the cam member 120 receives the power of the loading motor 110 for movement, thereby sliding the cam protrusion 301 of the rotary chassis 300 along the cam groove 121 of the cam member 120 and raising the same, as shown with a dotted line in FIG. 3. Consequently, the free end of the rotary chassis 300 is raised to place the disk 1 from the tray 400 onto the turntable 310.

After loading the disk 1 is complete, the optical pickup 210 moves in the radial direction of the disk 1 to record onto or reproduce from the recording surface of the disk 1. In this case, the optical pickup 210 operates the servomechanism of an objective lens to control the objective lens so that a focused light spot is formed on the recording surface of the disk 1. If the angle between the disk 1 and the optical pickup 210 deviates to an extent to which it may not be controlled simply by the servomechanism of the objective lens, the loading motor 110 is driven to rotate the rotary chassis 300 within a range of the cam groove 121, thereby adjusting skew between the disk 1 placed on the turntable 310 and the optical pickup 210. Thus, rotating the rotary chassis 300 dynamically controls skew between the disk 1 and the optical pickup 210, as well as the position of the objective lens of the optical pickup 210, so that light is precisely perpendicularly incident on the disk 1.

As described above, the optical disk drive according to the present invention dynamically controls skew between the disk 1 and the optical pickup 20 so that light is incident on the disk 1 in a precise direction, thereby increasing the optical disk drive performance of data recording and reproducing.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical disk, drive comprising:

a main body;

a tray driven by a loading motor to transport a disk in or out of the main body;

a base chassis on which an optical pickup emitting a beam onto a recording surface of the disk is mounted;

a rotary chassis rotatably installed at an end of the base chassis, the rotary chassis having a turntable on which the disk is placed; and a skew adjustment mechanism to control skew between the disk placed on the turntable and the optical pickup mounted on the base chassis by rotating, and raising a free end of the rotary chassis, which is opposite the end of the base chassis.

2. The optical disk drive of claim 1, wherein the skew adjustment mechanism comprises:

a cam member driven by the power of the loading motor, the cam member having a predetermined cam groove; and a cam protrusion formed at the free end of the rotary chassis to fit into the cam groove, wherein when the cam member is driven by the loading motor, the cam protrusion slides along the cam groove, thereby raising the free end of the rotary chassis.

3. The optical disk drive of claim 2, wherein the cam groove is formed with a margin extending beyond a point on the cam groove in which the disk is placed on the turntable, thereby adjusting the skew.

4. The optical disk drive of claim 2, further comprising:

a guide rail having a slanting portion provided on a bottom of the tray; and a protrusion connected to the cam member;

wherein, when the loading motor is driven to load the tray, the slanting portion of the guide rail presses against the protrusion to displace the cam member in an interlocking position.

5. The optical disk drive of claim 4, further comprising:

a plurality of gears, wherein, when the cam member is displaced in the interlocking position, the plurality of gears are meshed, thereby powering the loading motor to drive the cam member.

6. The optical disk drive according to claim 1, wherein the skew is controlled between the disk placed on the turntable and the optical pickup to focus a light beam to be perpendicularly incident on the disk.

7. The optical disk drive of claim 1, wherein the loading motor is used to adjust the skew.

8. A method of adjusting skew in an optical disk drive, comprising:

transporting a disk in or out of a main body of the optical disk drive via a tray, the tray being driven by a loading motor;

mounting an optical pickup on a base chassis to emit a beam onto a recording surface of the disk;

mounting a rotary chassis to an end of the base chassis, the rotary chassis having a turntable on which the disk is to be placed; and controlling skew between the disk placed on the turntable and the optical pickup mounted on the base chassis by rotating, and raising a free end of the rotary chassis which is opposite the end of the base chassis.

9. An optical disk drive, comprising:

a rotary chassis mounted to an end of a base chassis and having a turntable on which a disk is placed; and a skew adjustment mechanism to control skew between the disk placed on the turntable and an optical pickup mounted on the base chassis by rotating, and raising a free end of the rotary chassis, which is opposite the end of the base chassis.

10. The optical disk drive of claim 9, wherein the skew is controlled between the disk placed on the turntable and the optical pickup to focus a light beam to be perpendicularly incident on the disk.

11. A method of adjusting skew in an optical disk drive, comprising:

mounting a rotary chassis to an end of the base chassis, the rotary chassis having a turntable on which a disk is placed; and controlling skew between the disk placed on the turntable and the optical pickup mounted on the base chassis by rotating, and raising a free end of the rotary chassis which is opposite the end of the base chassis.

12. The method of claim 11, wherein the skew is controlled between the disk placed on the turntable and the optical pickup to focus a light beam to be perpendicularly incident on the disk.

13. An optical disk drive, comprising:

a tray to transport a disk in or out of a main body of the optical disk drive;

a rotary chassis mounted to an end of a base chassis and having a turntable on which the disk is placed;

a skew adjustment mechanism to control skew between the disk placed on the turntable and an optical pickup mounted on the base chassis by rotating, and raising a free end of the rotary chassis, which is opposite the end of the base chassis; and a loading motor mounted in the main body, and used to drive the tray and drive the skew adjustment mechanism to adjust the skew.

* * * * *

UNITED STATES PATENT AND TRADEMARK OFFICE
CERTIFICATE OF CORRECTION

PATENT NO. : 6,807,672 B2
DATED : October 19, 2004
INVENTOR(S) : Sang-joon Kim

It is certified that error appears in the above-identified patent and that said Letters Patent is hereby corrected as shown below:

Column 6,
Line 12, change "the base chassis" to -- a base chassis --.
Line 16, change "the optical pickup" to -- an optical pickup --.

Signed and Sealed this

Twenty-second Day of February, 2005

JON W. DUDAS
*Director of the United States Patent and Trademark Office*